US011948561B2

(12) United States Patent
Dusan et al.

(10) Patent No.: US 11,948,561 B2
(45) Date of Patent: Apr. 2, 2024

(54) AUTOMATIC SPEECH RECOGNITION IMPOSTER REJECTION ON A HEADPHONE WITH AN ACCELEROMETER (71) Applicant: Apple Inc., Cupertino, CA (US)

(72) Inventors: Sorin V. Dusan, San Jose, CA (US); Sungyub D. Yoo, Dublin, CA (US); Dubravko Biruski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 297 days.

(21) Appl. No.: 16/666,252

(22) Filed: Oct. 28, 2019

(65) Prior Publication Data
US 2021/0125609 A1 Apr. 29, 2021

(51) Int. Cl.
G10L 15/22 (2006.01)
G10L 15/08 (2006.01)
G10L 25/21 (2013.01)
G10L 25/84 (2013.01)

(52) U.S. Cl.
CPC .............. G10L 15/22 (2013.01); G10L 15/08 (2013.01); G10L 25/21 (2013.01); G10L 25/84 (2013.01); G10L 2015/088 (2013.01); G10L 2015/223 (2013.01)

(58) Field of Classification Search
CPC .. H40R 1/10; G06F 3/16; G06F 21/32; G10L 15/22; G10L 17/06; G10L 15/16; G10L 17/22; G10L 25/78; H04N 7/14; H04R 25/00; H04R 20/00
See application file for complete search history.

(56) References Cited

U.S. PATENT DOCUMENTS

| 9,313,572 | B2 | 4/2016 | Dusan et al. |
| 10,313,782 | B2 | 6/2019 | Dusan et al. |
| 10,681,453 | B1* | 6/2020 | Meiyappan ............... H04R 1/10 |
| 10,705,793 | B1* | 7/2020 | Young ...................... G06F 3/16 |
| 10,789,959 | B2* | 9/2020 | Kajarekar ............... G10L 17/22 |
| 2014/0270260 | A1 | 9/2014 | Goertz et al. |
| 2015/0179189 | A1* | 6/2015 | Dadu ....................... G10L 25/78 |
| 2017/0365249 | A1 | 12/2017 | Dusan et al. |
| 2018/0324518 | A1* | 11/2018 | Dusan ....................... H40R 1/10 |
| 2019/0034604 | A1* | 1/2019 | Zheng ..................... G06F 21/32 |
| 2019/0043479 | A1* | 2/2019 | Dorau ...................... G10L 15/04 |
| 2019/0043488 | A1* | 2/2019 | Bocklet ................... G10L 15/16 |
| 2019/0051299 | A1* | 2/2019 | Ossowski ............... G10L 15/22 |
| 2019/0221205 | A1* | 7/2019 | Czyryba ................. G10L 15/16 |
| 2019/0253785 | A1 | 8/2019 | Dusan et al. |

(Continued)

Primary Examiner — Richemond Dorvil
Assistant Examiner — Ethan Daniel Kim
(74) Attorney, Agent, or Firm — Aikin & Gallant, LLP (57) ABSTRACT A signal processing method to determine whether or not a detected key-phrase is spoken by a wearer of a headphone. The method receives an accelerometer signal from an accelerometer in a headphone and receives a microphone signal from at least one microphone in the headphone. The method detects a key-phrase using the microphone signal and generates a voice activity detection (VAD) signal based on the accelerometer signal. The method determines whether the VAD signal indicates that the detected key-phrase is spoken by a wearer of the headphone. Responsive to determining that the VAD signal indicates that the detected key-phrase is spoken by the wearer of the headphone, triggering a virtual personal assistant (VPA).

22 Claims, 5 Drawing Sheets (56) References Cited

U.S. PATENT DOCUMENTS

| | | | |
|---|---|---|---|
| 2020/0294493 A1* | 2/2020 | Terpilowski | G10L 15/16 |
| 2020/0160858 A1* | 5/2020 | Gomes | G10L 15/22 |
| 2020/0336836 A1* | 10/2020 | Rohde | H04R 20/00 |
| 2020/0365160 A1* | 11/2020 | Nassar | G10L 17/06 |
| 2021/0105565 A1* | 4/2021 | Pedersen | H04R 25/00 |
| 2021/0120206 A1* | 4/2021 | Liu | H04N 7/14 |
| 2021/0183373 A1* | 6/2021 | Moritz | G10L 15/16 |

* cited by examiner

AUTOMATIC SPEECH RECOGNITION IMPOSTER REJECTION ON A HEADPHONE WITH AN ACCELEROMETER

FIELD

An aspect of the disclosure relates to using an accelerometer in a headphone to determine whether or not a detected key-phrase is spoken by a wearer of the headphone. Other aspects are also described.

BACKGROUND

Headphones are an audio device that includes a pair of speakers, each of which is placed on top of a user's ear when the headphones are worn on or around the user's head. Similar to headphones, earphones (or in-ear headphones) are two separate audio devices, each having a speaker that is inserted into the user's ear. Both headphones and earphones are normally wired to a separate playback device, such as an MP3 player, that drives each of the speakers of the devices with an audio signal in order to produce sound (e.g., music). Headphones and earphones provide a convenient method by which the user can individually listen to audio content without having to broadcast the audio content to others who are nearby.

SUMMARY

An aspect of the disclosure is a signal processing method to determine whether or not a detected key-phrase is spoken by a wearer of a headphone. Specifically, an accelerometer signal is received from an accelerometer that is in the headphone, and a microphone signal is received from at least one microphone in the headphone. The microphone signal is used to detect a key-phrase contained therein that is used to trigger a virtual personal assistant (VPA). For instance, the VPA may be named Simon, and the key-phrase may be "Hey Simon". Also, using the microphone signal, a start time and an end time for the key-phrase is determined. In particular, the start time may be a time before the wearer utters "Hey" and the end time may be after the wearer utters "Simon". A voice activity detection (VAD) signal is generated based on the accelerometer signal. For instance, the VAD signal may be a digital signal, and have a high signal level (e.g., one) when the (energy of the) accelerometer signal is above an energy threshold, and have a low signal level (e.g., zero) when the accelerometer signal is below the threshold. From a portion of the VAD signal that starts at the start time and ends at the end time, a VAD score is generated. The method determines whether the VAD score is above a VAD score threshold. In response to the VAD score being above the VAD score threshold, a trigger signal to trigger (activate) the VPA is generated. In response, however, to the VAD score being below the VAD score threshold, it may be determined that an imposter, or someone other than the wearer, is saying the key-phrase, and therefore the VPA may not be triggered.

The above summary does not include an exhaustive list of all aspects of the disclosure. It is contemplated that the disclosure includes all systems and methods that can be practiced from all suitable combinations of the various aspects summarized above, as well as those disclosed in the Detailed Description below and particularly pointed out in the claims. Such combinations may have particular advantages not specifically recited in the above summary.

BRIEF DESCRIPTION OF THE DRAWINGS

The aspects are illustrated by way of example and not by way of limitation in the figures of the accompanying drawings in which like references indicate similar elements. It should be noted that references to "an" or "one" aspect of this disclosure are not necessarily to the same aspect, and they mean at least one. Also, in the interest of conciseness and reducing the total number of figures, a given figure may be used to illustrate the features of more than one aspect, and not all elements in the figure may be required for a given aspect.

DETAILED DESCRIPTION

Several aspects of the disclosure with reference to the appended drawings are now explained. Whenever the shapes, relative positions and other aspects of the parts described in a given aspect are not explicitly defined, the scope of the disclosure here is not limited only to the parts shown, which are meant merely for the purpose of illustration. Also, while numerous details are set forth, it is understood that some aspects may be practiced without these details. In other instances, well-known circuits, structures, and techniques have not been shown in detail so as not to obscure the understanding of this description. Furthermore, unless the meaning is clearly to the contrary, all ranges set forth herein are deemed to be inclusive of each range's endpoints.

Figure 1:
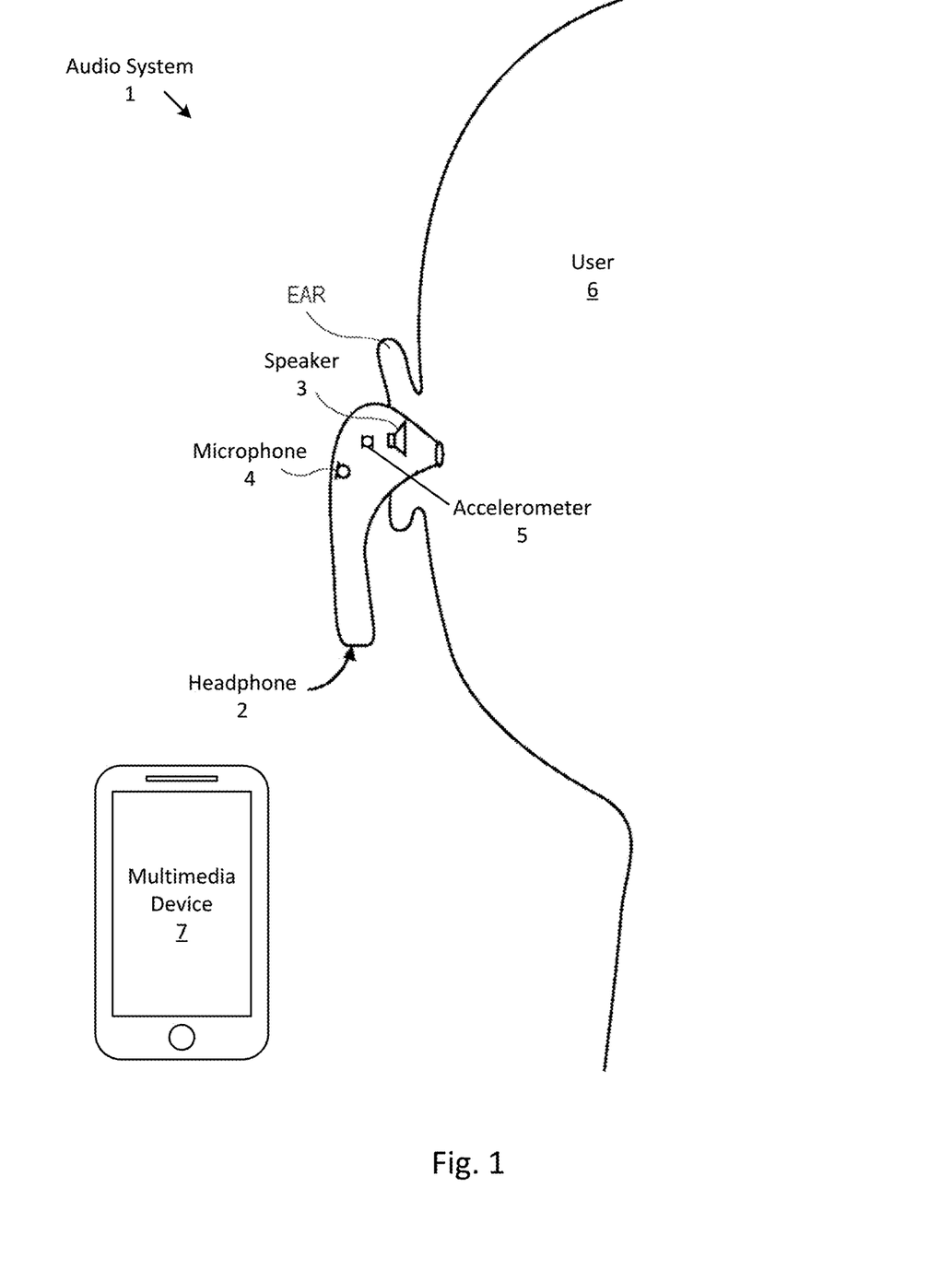
FIG. 1 shows an audio system that includes a user wearing a headphone according to one aspect of the disclosure.

FIG. 1 illustrates an audio system 1 that includes a headphone (or headset) 2 being worn by a user (or wearer) 6 (e.g., placed inside the user's ear 8) and a multimedia device 7. In one aspect, the audio system 1 may also include other devices, such as a remote electronic server (not shown) that may be communicatively coupled to either of the headphone and multimedia device 7, and is configured to perform one or more operations as described herein. As illustrated, the headphone is an in-ear earbud or an in-ear headphone. In one aspect, the headphone may be a sealing type that has a flexible ear tip that serves to acoustically seal off the entrance to the user's ear canal from the ambient environment by blocking or occluding in the ear canal (thereby achieving strong passive ambient sound isolation). The headphone 2 may be one of two headphones (left and right) that make up a headset. The methods described herein may be implemented in one or both of the headphones that make up a headset. In one aspect, the headphone 1 may be any electronic device that includes at least one speaker, at least one microphone (which may be external and/or internal), and at least one accelerometer. In one aspect, the headphone 2 may be an on-the-ear headphone or an over-the-ear headphone, which may be closed-back or open-back.

In one aspect, the headphone may also be any electronic device that is capable of performing networking operations, as described herein. For instance, the headphone may be a wireless electronic device that is configured to establish a wireless connection data link (in order to be communicatively coupled) with a multimedia device, such as device 7, over a wireless computer network, using e.g., BLUETOOTH protocol or a wireless area network. In one aspect, the headphone may be communicatively coupled to the multimedia device 7 via a wire. As illustrated, the multimedia device 7 is a smart phone. In one aspect, however, the device 7 may be any computing electronic device, such as a tablet computer, a laptop, a desktop computer, a smart speaker, etc. In another aspect, the device 7 may be a wearable device, such as smart glasses or a smart watch. During an established wireless connection, the headphone may exchange (e.g., transmit and receive) data packets (e.g., Internet Protocol (IP) packets) with the multimedia device. In one aspect, this wireless connection is pairing the headphone with the multimedia device in order to allow the headphone to perform at least some operations that may otherwise be performed by the device 7. For example, the user 6 may participate in a handsfree phone call that is initiated by the multimedia device, but conducted through the headphone. As another example, as described herein, the headphone may perform an automatic trigger detection (ATD) algorithm to detect whether the user of the headphone is trying to trigger a virtual personal assistant (VPA) algorithm (which may be executed by the multimedia device 7). More about ATD and triggering the VPA is described herein.

The headphone 2 includes a microphone 4, an accelerometer 5, and a speaker 3. The speaker is arranged and configured to reproduce sound that is represented in an audio signal directly into the ear of the user. The microphone 4 may be an external microphone that is arranged and configured to receive ambient sound (which may include noise within the ambient environment and/or speech of the user 6) directly from the ambient environment, and produce an audio signal (microphone signal) that represents (or contains) the ambient sound. The headphone is configured to acoustically couple the microphone to the ambient environment of the headphone. In one aspect, the headphone may include an internal microphone, which is arranged and configured to directly receive sound reproduced by the speaker 3. In one variation, as integrated in the headphone and worn by its user, the microphone 4 may be more sensitive than an internal microphone (not shown) to a far field sound source outside of the headphone. Viewed another way, as integrated in the headphone and worn by its user, the microphone 4 may be less sensitive than an internal microphone to sound within the user's ear.

The accelerometer 3 is arranged and configured to receive (detect or sense) speech vibrations that are produced while the user 6 is speaking, and produce an accelerometer signal that represents (or contains) the speech vibrations. Specifically, the accelerometer 3 is configured to sense bone conduction vibrations that are transmitted from the vocal cords of the user to the user's ear (ear canal), while speaking and/or humming. In one aspect, the number of elements of the headphone 2 may be different and/or may be positioned at different locations about the headphone. For instance, the headphone may include two or more microphones, as described herein. As illustrated, the accelerometer 5 is behind the speaker 3. In one aspect, however, the accelerometer may be positioned anywhere on or within the headphone.

Headphones, such as headphone 2, provide a user with many capabilities. For instance, using the headphone, a user may individually listen to audio content (e.g., music) or conduct a phone call (e.g., voice call and/or video call) without broadcasting sound to others who are within a close proximity. In addition, the headphone may include the capability to detect whether or not the user is attempting to activate (or initiate a conversation with) a virtual personal assistant (VPA) or voice assistant, which is a software application that may be executing on the headphone or on a companion device with which the headphone is communicatively coupled, such as the multimedia device 7. Specifically, the headphone may include an automatic trigger detection (ATD) algorithm that is configured to analyze speech of the wearer of the headphone that is sensed by the microphone 4. The ATD algorithm may analyze the speech to detect a key-phrase (or a trigger word or phrase), which is associated with a user request to activate the VPA. In other words, the key-phrase is a short phrase (e.g., one or more words) that the user says right before issuing a voice command or query to be sent to the automatic speech recognition (ASR) algorithm as part of the VPA. In one aspect, the ASR engine may reside on a VPA server and/or on a companion device, such as the multimedia device 7. Once detected, the ATD algorithm may generate a trigger signal, which is used to activate the VPA in order to initiate a conversation with the user. Once triggered, the user may issue verbal commands or instructions for the VPA to respond. Such commands may include "What time is it?" In which case, the VPA may issue an audible response (for output through the speaker of the headphone) of "It is five o'clock." More about activating the VPA is described herein.

In one aspect, the headphone 2 is configured to determine whether or not a detected key-phrase is spoken by the wearer of the headphone or is spoken by an "imposter," which is someone other than the wearer. In particular, the headphone 2 is configured to implement the ATD algorithm to reject false triggers, which may include key-phrases that are uttered by imposters to activate the VPA and/or ambient noise within the environment in which the headphone is located. In one aspect, to do this, the ATD algorithm may use the microphone and/or the accelerometer in the headphone. As described herein, the accelerometer produces a signal that represents bone conduction vibrations caused while the wearer speaks. In one aspect, the accelerometer may be less sensitive to acoustic air vibrations (e.g., sounds) within the ambient environment. In other words, the accelerometer may be less sensitive to speech of imposters and ambient noise, as opposed to when the wearer speaks. As a result, the accelerometer signal may be different when an imposter speaks versus when the wearer speaks (e.g., the accelerometer signal may have an energy level that is less than an energy threshold and/or the accelerometer signal may not be correlated with a microphone signal produced by the microphone during times at which the imposter is speaking but the wearer is not). Thus, the ATD algorithm may determine whether an imposter or the wearer has said the key-phrase based on a microphone signal produced by the microphone 4 in the headphone and based on an accelerometer signal produced by the accelerometer 5. For example, the ATD algorithm may compare a portion of the microphone signal that corresponds to an end portion of the partially uttered key-phrase with an accelerometer signal that is received after the key-phrase has begun to be uttered. Specifically, the ATD algorithm may determine whether the wearer is saying the key-phrase based on cross-correlation of the portion of the microphone signal that contains an end portion of the key-phrase and the accelerometer signal (e.g., the more similar the signals the more likely the wearer is saying the key-phrase).

As described above, in this implementation, a headphone may activate the accelerometer when it is determined that the key-phrase is already being said by the user based on a partial key-phrase detection using a microphone signal produced by a microphone in the headphone. For instance, the headphone may keep the microphone activated at all times (e.g., while the headphone is in an on-state, such as while the headphone is inserted into the user's ear) in order for the microphone to capture sound of the ambient environment as a microphone signal. In one aspect, the microphone may remain active while the headphone is on because the microphone may be a low-power consumption device. The ATD algorithm may analyze the microphone signal to detect whether a (e.g., beginning) portion of a key-phrase is contained therein. Once detected, the ATD algorithm may activate the accelerometer to produce the accelerometer signal, and determine whether the wearer of the headphone or an imposter is saying the key-phrase based on an analysis of the end portion of the microphone signal and the accelerometer signal. In one aspect, as opposed to the microphone, the accelerometer remains inactive (or off) until it is determined that the microphone signal contains the partial key-phrase in order to conserve battery power.

Figure 2A:
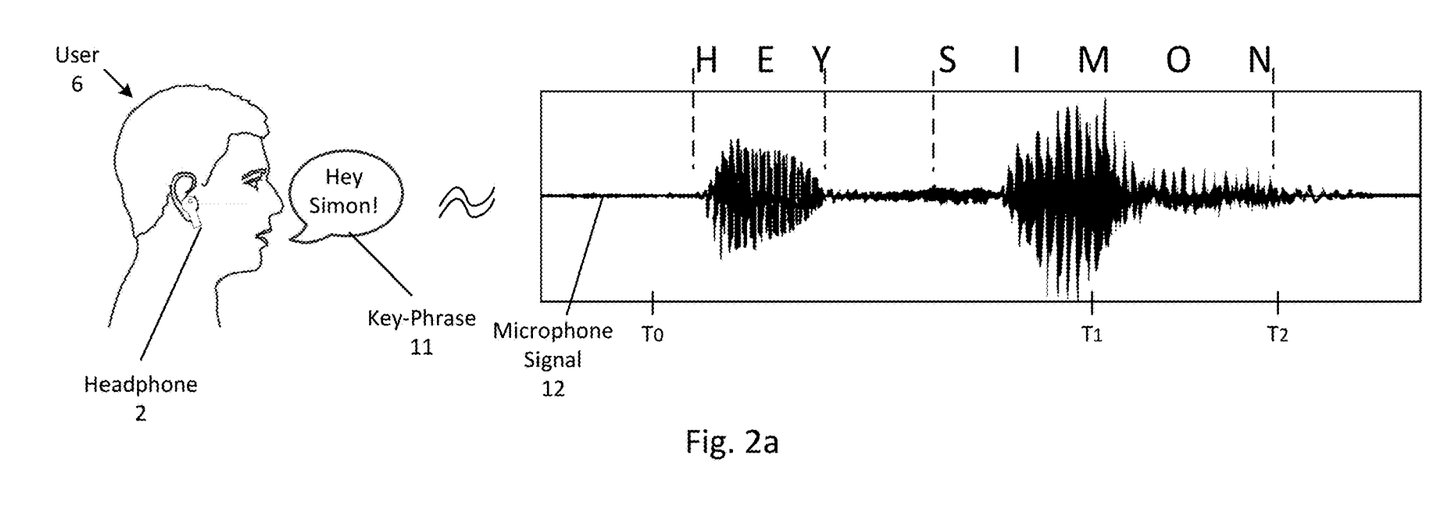
FIGS. 2a and 2b shows a user who is wearing a headphone utter a key-phrase at different speeds, and shows corresponding microphone signals produced by a microphone in the headphone.
Figure 2B:
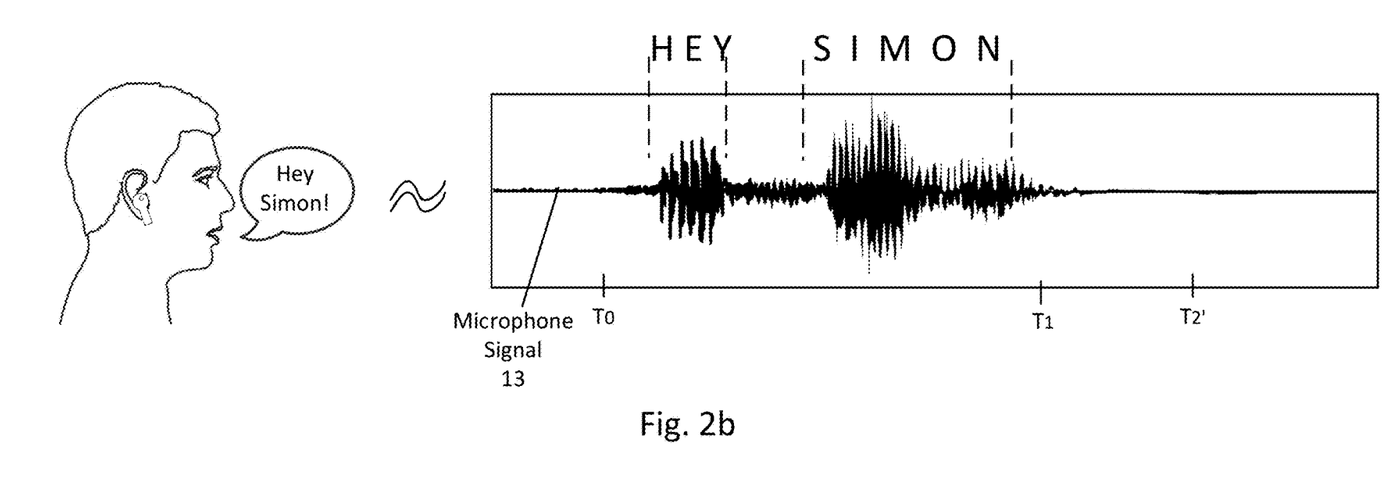

Although this implementation may be effective in rejecting imposters, there are drawbacks. For example, this implementation may be less effective when wearer says the key-phrase at a fast speech rate or speed (e.g., faster than a normal or average user would speak). Specifically, if the wearer is saying the key-phrase fast, by the time the accelerometer is activated the wearer may have already finished saying the entire key-phrase. As a result, the ATD algorithm would falsely determine that the key-phrase was said by an imposter, and therefore not trigger the VPA. FIGS. 2a and 2b illustrate such a scenario.

FIGS. 2a and 2b show a user (e.g., user 6) who is wearing the headphone 2 say a key-phrase at different speech rates, and shows corresponding microphone signals produced by the microphone 4 in the headphone. Specifically, both figures illustrate the user 6 saying the key-phrase 11 "Hey Simon!", and illustrate different microphone signals that are captured by the microphone 4, as a function of time.

FIG. 2a illustrates the user 6 saying the key-phrase at a normal or average speech rate. In one aspect, a "normal or average" speech rate may be a rate at which the general public speaks during a conversation. For instance, a normal speech rate may be below 160 words per minute (WPM). In contrast, a fast speech rate may be above 160 WPM. In another aspect, the normal and/or fast speech rates may vary. Returning to FIG. 2a, while the microphone is capturing ambient sound the user 6 begins to say the key-phrase at $T_0$. A key-phrase detector algorithm analyzes the microphone signal 12 and detects a partial key-phrase, "Hey Sim", from $T_0$ to $T_1$. In one aspect, the key-phrase detector algorithm may detect the partial key-phrase by comparing (portions of) the microphone signal 12 to a predetermined microphone signal that is associated with the partial key-phrase. For example, the key-phrase detector algorithm may compare the spectral content of the microphone signal 12, such as the content between $T_0$ and $T_1$ with predetermined spectral content of the partial key-phrase "Hey Sim". Once the partial key-phrase is detected, the key-phrase detector algorithm activates the accelerometer at $T_1$ (or immediately thereafter) in order to produce an accelerometer signal. The ATD algorithm may analyze the microphone signal 12 with respect to the accelerometer signal to determine whether a remainder of the key-phrase between $T_1$ and $T_2$ ("on") is being spoken by the user 6 or by an imposter. For instance, since the user 6 is saying the remainder of the key-phrase, the accelerometer will sense bone conduction vibrations as the accelerometer signal. These vibrations may be compared (e.g., cross-correlated) with the speech contained within the microphone signal 12, such as the portion of the microphone signal after $T_1$. Once the ATD algorithm determines that the user 6 has said at least the remainder of the key phrase (and/or the entire key-phrase between $T_0$ and $T_2$), the ATD algorithm may produce a trigger signal to trigger the VPA, and the accelerometer may be deactivated at $T_2$. In one aspect, the time between $T_1$ and $T_2$ may be predetermined (e.g., three seconds).

FIG. 2b illustrates the user 6 saying the key-phrase at a fast speech rate, as compared to the speech rate at which the user said the key-phrase in FIG. 2a. Specifically, the entire key-phrase 11 is spoken before $T_1$, in contrast to the partial key-phrase that is spoken by that time when the user says the phrase at a normal speech rate. Since the user finishes saying the key-phrase before $T_1$, by the time the ATD algorithm is able to activate the accelerometer at $T_1$ the user has stopped speaking. In one aspect, the headphone may be unable to activate the accelerometer before $T_1$ based on several factors. For example, the delay may be due to processing time (e.g., time to analyze the microphone signal, time to activate the accelerometer, etc.). In one aspect, the headphone may be unable to activate the accelerometer due to extra time needed to analyze the microphone signal and detect the key-phrase because of the fast rate at which the key-phrase is said. Thus, since the accelerometer has been activated after the user has finished saying the key-phrase, the ATD algorithm will erroneously determine that the phrase was spoken by an imposter, based on a comparison of the accelerometer signal with the microphone signal between T1 and T2'. This results in the ATD algorithm interpreting the utterance of the key-phrase as a false negative, and therefore not activating the VPA as a result. This may be due to both signals having little to no cross-correlation during this period of time. In one aspect, T2' may be less than T2. In another aspect, both times are the same. Therefore, there is a need for an ATD algorithm that is able to distinguish between an imposter and a wearer saying a key-phrase, regardless at what speech rate the key-phrase is spoken in order to reject the imposter.

To overcome these deficiencies, the present disclosure describes an audio system that is capable of implementing an ATD algorithm that is able to reject imposters from triggering a VPA, using a microphone and an accelerometer in a headphone. Specifically, the audio system receives an accelerometer signal from the accelerometer 5 and receives a microphone signal from the microphone 4, both of which are in the headphone 2. As opposed to previously mentioned method that may activate the accelerometer once a partial key-phrase is detected, the audio system may receive the accelerometer signal while the headphone 2 is on. In other words, both the microphone and the accelerometer may remain on such that the microphone signal and the accelerometer signal are received while the headphone is on (e.g., in the on-state). In one aspect, the accelerometer 5 remains always on because the accelerometer may be a low-power element that does not consume much battery power. The system uses the microphone signal to detect a key-phrase (e.g., "Hey Simon") contained therein, and determines a start time and an end time for the key-phrase. For instance, the start time may be a time at or before the user begins saying the key-phrase, and the end time may be a time at or after the user finishes saying the key-phrase. The system generates a voice activity detection (VAD) signal based on the accelerometer signal and generates a VAD score using a portion of the VAD signal that starts at the start time and ends at the end time. Thus, the system analyzes the VAD signal during a time at which the key-phrase is being uttered, rather than relying on only a portion of the uttered key-phrase. The system determines whether the VAD score is above a VAD score threshold, and in response to being above the VAD score threshold, generates a trigger signal to trigger a VPA. Thus, the audio system is able to determine whether or not a detected key-phrase is spoken by a wearer, regardless of what speech rate the detected key-phrase is spoken at.

Figure 3:
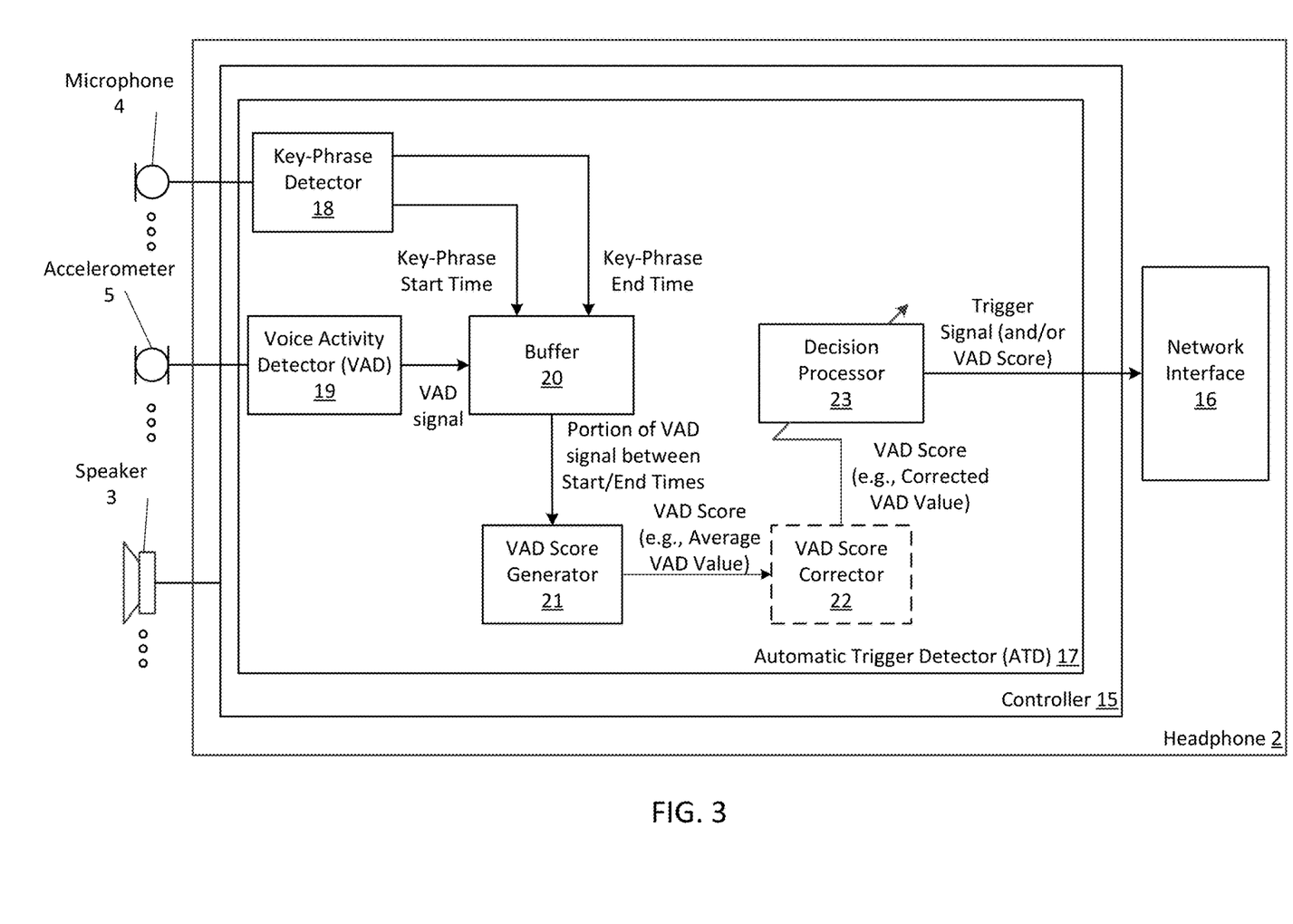
FIG. 3 is a block diagram of a headphone that performs automatic speech recognition using an accelerometer signal to determine whether a detected key-phrase is spoken by a wearer of the headphone according to one aspect.

FIG. 3 is a block diagram of headphone 2 that performs automatic speech recognition using an accelerometer signal to determine whether a detected key-phrase is spoken by a wearer of the headphone according to one aspect. The headphone 2 includes the microphone 4, the accelerometer 5, the speaker 3, a controller 15, and a network interface 16. In one aspect, the headphone may include more or less elements (or components) as described herein. For instance, the headphone may include two or more speakers, two or more accelerometers, two or more (external and/or internal) microphones, and/or a display screen that is configured to display image data.

As described herein, the headphone 2 may be a wireless electronic device that is configured to establish a wireless communication data link via the network interface 16 with another electronic device, such as the multimedia device 7, over a wireless computer network (e.g., a wireless personal area network (WPAN)) using e.g., BLUETOOTH protocol or a WLAN in order to exchange data. As described herein, the headphone 2 may establish the connection with the device 7 in order to pair both devices together. In one aspect, the (e.g., programmed processor of the) device 7 may perform one or more of the operations described herein, such as ATD operations. In this case, the device 7 may execute (at least a portion of) the ATD algorithm to determine whether or not a detected key-phrase is spoken by the wearer of the headphone 2. For instance, the multimedia device may obtain a microphone signal produced by the microphone 4 and an accelerometer signal produced by the accelerometer 5, and perform (at least a portion of) the ATD algorithm described herein. In another aspect, at least some of the elements of the headphone 2 may be a part of the multimedia device (or another electronic device) within the audio system 1, such as the speaker 3 and/or microphone 4.

In one aspect, the network interface 16 is configured to establish a wireless communication data link with a wireless access point in order to exchange data with a remote electronic server (e.g., over the Internet). In another aspect, the network interface 16 may be configured to establish a communication data link via a mobile voice/data network that employs any type of wireless telecom protocol (e.g., a 4G Long Term Evolution (LTE) network).

As described herein, the microphone may be any type of microphone (e.g., a differential pressure gradient micro-electro-mechanical system (MEMS) microphone) that is configured to convert acoustical energy caused by sound wave propagating in an acoustic environment (e.g., speech of the user who is wearing the headphone 2) into a microphone signal. The speaker 3 may be an electrodynamic driver that may be specifically designed for sound output at certain frequency bands, such as a woofer, tweeter, or midrange driver, for example. In one aspect, either speaker may be a "full-range" (or "full-band") electrodynamic driver that reproduces as much of an audible frequency range as possible.

The controller 15 may be a special-purpose processor such as an application-specific integrated circuit (ASIC), a general purpose microprocessor, a field-programmable gate array (FPGA), a digital signal controller, or a set of hardware logic structures (e.g., filters, arithmetic logic units, and dedicated state machines). The controller is configured to perform ATD operations and networking operations. In one aspect, the controller may also be configured to perform some VPA operations, as described herein. In another aspect, although illustrated as being separate, (a portion of) the network interface 16 may be a part of the controller 15. In some aspects, the controller may include memory that is configured to store instructions which when executed by at least one processor (of the controller 15) performs at least some of the operations described herein. More about how the controller 15 performs these operations is described herein.

The controller includes an automatic trigger detector (ATD) 17 that is configured to perform an ATD algorithm according to one aspect of the disclosure. The automatic trigger detector has several operational blocks, which include a key-phrase detector 18, a voice activity detector (VAD) 19, a buffer 20, a VAD score generator 21, a VAD score corrector 22, and a decision processor 23.

The operations performed by each of the blocks of the trigger detector 17 will now be described. The key-phrase detector 18 is configured to receive (obtain) a microphone signal from (at least one) microphone 4 that contains sound from the ambient environment that is captured by the microphone. The key-phrase detector 18 is also configured to use the microphone signal to detect a (potential) key-phrase contained therein. Specifically, the detector 18 analyzes the microphone signal in order to detect (identify or recognize) speech contained therein. In one aspect, the detector may compare the recognized speech to pre-stored models of the key-phrases that are stored in local memory (e.g., in the controller). For instance, the detector 18 may compare the patterns of at least a portion of the microphone signal (with respect to time) with the patterns of a stored model of a key-phrase, such as "Hey Simon!". As another example, the detector may compare patterns of the portion (with respect to time) with patterns of the pre-stored key-phrases. In one aspect, the detector may detect the key-phrase when the recognized speech matches the pre-stored key-phrase model, or when a pre-stored key-phrase model is similar to the microphone signal, up to a tolerance (e.g., 1%, 5%, 10%, 15%, etc.). In another aspect, to detect the key-phrase, the detector may determine whether there is a portion of the microphone signal that is below a microphone energy threshold, which may represent a pause in speech. In one aspect, upon determining that the microphone signal contains the paused speech (or a lack of speech), the key-phrase detector may determine whether the key-phrase contained therein matches a pre-stored key-phrase model.

When a match is found, the detector determines a start time and an end time for the key-phrase. Specifically, the detector determines a time (e.g., $T_0$) at which the user begins to say the key-phrase and a time (e.g., $T_2$) at which the user finishes saying the key-phrase. In one aspect, both $T_0$ and $T_2$ are only available immediately after $T_2$. This is in contrast to the operations performed with respect to FIGS. 2a and 2b, in which an intervening point in time (e.g., $T_1$) is determined to identify that a partial key-phrase is detected in order to activate the accelerometer. In one aspect, $T_0$ may correspond to a point (or a portion) within the microphone signal after which at least a portion of the recognized speech (e.g., key-phrase) is matched with the pre-stored key-phrase model. Similarly, $T_2$ may correspond to a point (or a portion) within the microphone signal after which the recognized speech does not match the pre-stored key-phrase. In one aspect, either time may be (or contain an) offset from the start/end time of the key-phrase. For instance, $T_0$ may be a point in time before the key-phrase is detected within the microphone signal (e.g., ten milliseconds). In one aspect, the offset is predetermined. The detector 18 transmits at least two markers (or pointers) that contain time stamps to the buffer 20, where one marker contains a time stamp that corresponds to the start time and another marker contains a time stamp that corresponds to end time.

The voice activity detector (VAD) 19 is configured to receive an accelerometer signal from the accelerometer 5 and optionally from the microphone signal 4. In one aspect, the accelerometer signal represents vibrations sensed by the accelerometer, such as bone conduction vibrations that are produced while the user speaks. The VAD 19 is further configured to generate a VAD signal based on the accelerometer signal. In one aspect, the VAD signal may be a digital signal that may have a combination of low signal level(s) and/or high signal levels(s), as a function of time. The VAD determines whether an energy level of the accelerometer signal is above an accelerometer energy threshold (or energy threshold). In response to determining that the energy level is above the energy threshold, the VAD signal is set to a high signal level (e.g., one), whereas, in response to determining that the energy level is below the energy threshold, the VAD signal is set to a low signal level (e.g., zero). In one aspect, the high signal level may be any value or magnitude that is greater than the low signal level.

In one aspect, the VAD signal may have a digital (or binary) output over a series of frames based on the accelerometer signal. Each of the frames may correspond to a period of time (e.g., five, 10, 15 milliseconds). The VAD may separate the accelerometer signal into frames, each containing the energy level of the accelerometer signal within that period of time. In one aspect, the energy level may be an average level over that period of time. The VAD may then determine whether the energy level in each frame is above or below the energy threshold. Once determined, the VAD may generate the VAD signal as a digital signal that is high or low that correspond to the energy level of each frame in the series of frames.

In one aspect, the microphone 4, the detector 18, the accelerometer 5, and/or the VAD 19 may always be on (or activated), while the headphone 2 is powered on (or in the on-state). In particular, the microphone and detector may always be active, such that the detector is continuously receiving the microphone signal, and using the microphone signal to detect whether the signal contains a key-phrase therein. Similarly, the accelerometer and VAD may always be active, such that the VAD is continuously receiving the accelerometer signal, and generating the VAD signal based on the accelerometer signal.

The buffer 20 is a data buffer that is configured to store the VAD signal that is obtained from the VAD 19. In one aspect, the buffer may store the VAD 19 as a series of bits, where each bit represents a signal level (e.g., one for the high signal level and zero for the low signal level) for a period of time (e.g., one frame). In another aspect, the buffer may be a rolling buffer that stores a finite amount of data (e.g., five seconds of data). Once the buffer is filled (e.g., after two minutes), the oldest data is overwritten with new data.

As described herein, the buffer 20 receives at least two markers from the detector 18, which indicate the start/end times of a detected key-phrase. In response, the buffer is configured to transmit a portion of the VAD signal that corresponds to the time stamps contained within the two markers. Specifically, the buffer is configured to transmit the portion of the VAD signal that is between (and includes) the start time (e.g., $T_0$) and the end time (e.g., $T_2$) to the VAD score generator 21. In one aspect, the detector 18 may transmit the two markers to the VAD score generator 21, which may be configured to retrieve the portion of the VAD signal from the buffer.

The VAD score generator 21 is configured to generate a VAD score using the portion of the VAD signal that is obtained (retrieved) from the buffer 20. In one aspect, the VAD score is generated by averaging the portion of the VAD signal to produce an average VAD score value as the VAD score. Specifically, the VAD score generator 21 determines how much (or how many frames) of the portion of the VAD signal has a high signal level over the entire portion of the VAD signal. For example, if the portion contained 100 frames and of those 100 frames 70 were high (having a bit value of 1), the VAD score would be 0.70.

The VAD score corrector 22 is configured to receive the VAD score, which is the average VAD value, and apply a correction factor to the average VAD value that accounts for segments of the portion of the VAD signal that are set to the low signal level in a normally uttered key-phrase. In particular, the correction factor is accounting for gaps (e.g., pauses) or portions within the key-phrase where the accelerometer does not produce any significant signal. For instance, the segments of the VAD signal that are set to the low signal level may correspond to gaps or pauses in the user's speech. As an example, the user may pause at least two times while saying the key-phrase "Hey Simon". One pause may be before "Hey," since the user is beginning a new sentence or thought, and another pause may be between "Hey" and "imon", as corresponding to the voiceless fricative /S/. In one aspect, a gap or pause may correspond to portions of the accelerometer signal that includes an energy level that is less than a threshold accelerometer energy level. In another aspect, the gap or pause may include a portion of the key-phrase. For instance, referring to FIG. 2a, there is a gap that includes a pause (a time at which the user is not speaking right before /H/) and a gap during /S/ in the second word "Simon". Since the user is not speaking and/or since the energy level of the microphone signal is below a threshold during these pauses, the accelerometer signal will have a low energy level. Thus, the threshold that defines the signal level of the VAD with respect to the accelerometer may be defined such that during times at which there is a gap, which may correspond to the user not speaking or saying a portion of a word that is not detected by the microphone, the accelerometer is below this threshold. More about the gaps is described with reference to FIG. 4. In one aspect, the correction factor is the following equation $$100/100 - \text{Gap Percentage}$$

where the gap percentage is the percentage of the portion of the VAD signal that is a low signal level in a normally uttered key-phrase. Continuing with the previous example, the Gap Percentage would be 30, since 70 of the 100 frames were high for a typical normally uttered key-phrase as shown in FIG. 5. In this case, the corrected VAD score is 1.4286*0.70=1.0. In one aspect, if the resulting score is greater than one, then the VAD score may be set to one. In another aspect, the correction factor may be a predefined value based on a specific key-phrase. For example, the correction factor may be based on the key-phrase used for the detector 18.

In one aspect, the operations performed by the VAD score corrector 22 may be optional. For example, a correction factor may not need to be applied to the VAD score when the key-phrase does not contain any gaps or pauses, like in the case of a key-phrase which contains only voiced sounds. This may be the case when the key-phrase is a single word (e.g., "Allen" rather than "Hey Simon").

The decision processor 23 is configured to receive the VAD score, and is configured to determine whether the VAD score is above a VAD score threshold. Specifically, the processor determines whether the VAD score is above a (predetermined) threshold. For instance, the processor may compare the corrected VAD score (and/or the average VAD score produced by the VAD score generator 21) to the VAD score threshold. In response to the VAD score being above the threshold, the generator is configured to trigger a VPA. In particular, the decision processor 23 is configured to generate a trigger signal, which may be a digital signal, such that when the VAD score is above the threshold the trigger signal has a high signal level. Whereas, when the VAD score is below the score threshold, the trigger signal has a low signal level. As a result, when the trigger signal has a high signal level it is determined that the detected key-phrase is (or has been) spoken by the wearer of the headphone 2, who wishes to trigger or activate the VPA. In contrast, when the VAD score is below the threshold, the decision processor 23 may not generate a trigger signal, since a VAD score below the threshold may correspond to an imposter saying the key-phrase (or a different phrase being said entirely). In one aspect, the decision processor may receive a VAD score below the threshold, which indicates that the VPA is not be activated, and therefore rejecting an imposter from attempting to activate the VPA.

In one aspect, the headphone 2 is configured to transmit the trigger signal to a companion device (e.g., the multimedia device 7), with which the headphone is paired to activate the VPA. In one aspect, if not already paired, the headphone is configured to establish, via the network interface 16, a communication data link in order to communicatively couple the headphone with the multimedia device. The network interface 16 is configured to transmit the trigger signal produced by the decision processor 23, via the communication data link, to the multimedia device 7. Upon receipt of the trigger signal, the multimedia device 7 may activate (or perform) a VPA algorithm (e.g., an automatic speech recognition algorithm), which is configured to perform speech recognition operations for initiating a conversation between the VPA and the wearer. In one aspect, the device may transmit an audible response as an audio signal back to the headphone, via the communication data link. The headphone is configured to use the audio signal to drive the speaker 3 to output the audible response (e.g., "Yes Dave? How Can I Help You?"). The microphone 4 in the headphone may sense a follow-up command spoken by the user (e.g., "What time is it?") as the microphone signal and transmit the signal back to the multimedia device. The VPA algorithm that is executing within the multimedia device may be configured to recognize speech contained therein to identify words spoken by the user. The device may then transmit, via the Internet, the recognized speech to a remote electronic server (e.g., a digital assistant server) to analyze and generate a suitable textual response to the command. In one aspect, the device may transmit the command (microphone signal) to the server, without recognizing speech. Once the device receives a suitable textual response (e.g., "It is five o'clock") to the command from the server, the device 7 may have a text-to-speech (TTS) system synthesize the textual response into an audible response as an audio signal. The audio signal may then be transmitted back to the headphone for output via the speaker 3. In one aspect, rather than receiving a suitable textual response, the device may receive a previously recorded human-spoken phrase as audio to be transmitted back to the headphone.

In one aspect, the operations performed by the digital assistant server may be performed by the multimedia device 7. For example, the device may generate the suitable textual response to the command. In another aspect, at least some of the operations performed by the multimedia device may be performed by the headphone. For instance, the headphone may recognize speech contained within the microphone signal and generate the suitable textual response. The headphone may transmit the response (e.g., textual data) to the device in order for the VPA algorithm executing on the device to perform TTS operations. In another aspect, rather than communicate with a companion device, the headphone may communicate directly with the digital assistant server. In this case, the headphone may transmit data (e.g., the trigger signal, microphone signal, etc.) to the server, via a wireless access point and over the Internet. In some aspects, at least some of the operations performed by the automatic trigger detector 17 may be performed by the multimedia device 7, as described herein.

In one aspect, along with transmitting the trigger signal, the headphone may transmit the (corrected and/or average) VAD score to the multimedia device. For example, the multimedia device may perform a double check by determining that the VAD score is above the VAD score threshold. In another aspect, the device may use a different VAD score threshold than the VAD score threshold used by the headphone. As a result, the device 7 may determine whether the VAD score is above the different (or the same) VAD score threshold. In response to the multimedia device determining that the VAD score is above the threshold, the device may transmit a command to the headphone to begin transmitting the microphone signal (and/or accelerometer signal) to perform speech recognition algorithms. In another aspect, the headphone may start sending (or streaming) the microphone signal and/or accelerometer signal with the trigger signal (and/or with the VAD score), upon the decision processor 23 (and/or the device 7) determining that the VAD score is above the VAD threshold. In addition, the headphone may transmit any buffered audio data to the multimedia device.

Returning to FIG. 3, the headphone may perform different operations when the key-phrase is determined to have been spoken by an imposter. In one aspect, the headphone may be prevented from transmitting any triggering data (e.g., the trigger signal, the VAD score, and/or microphone signal upon determining that the VAD score is below the threshold. In particular, the headphone may prevent transmission by not instructing the network interface 16 to at least one of 1) establish a communication data link with the multimedia device and/or 2) not transmit any of the triggering data. By not transmitting any triggering data to the multimedia device, the headphone conserves battery power that would otherwise be needed to transmit the data. In another aspect, the headphone may transmit the VAD score, without any audio data to the multimedia device upon determining the score is below the threshold in order for the multimedia device to make a final decision. Based on the final decision, the headphone may or may not transmit any additional data, such as the microphone signal and/or the accelerometer signal.

In one aspect, the headphone may include two or more microphones that are configured to produce acoustic microphone signals. The controller 15 may include a beamformer that is configured to process the acoustic microphone signals to form at least one directional beam pattern in a particular direction so as to be more sensitive to a sound source in the environment. In this case, the beamformer obtains two or more acoustic microphone signals from each of two or more microphones of the headphone, and produces the beam pattern by applying beamforming weights (or weight vectors) upon the signals. As a result, the beamformer produces at least one sound pickup output beamformer audio signal that includes the directional beam pattern that is aimed towards the sound source. In another aspect, the headphone may include two or more speakers. In this case, the beamformer may be configured to produce driver signals from audio program content (such as an audible response) to form at least one sound output directional beam pattern that is projected in a particular direction in the environment.

In one aspect, at least some of the operations described herein are optional operations that may or may not be performed. Specifically, blocks that are illustrated as having dashed or dotted boundaries may optionally be performed. In another aspect, other operations described in relation to other blocks may be optional as well.

Figure 4:
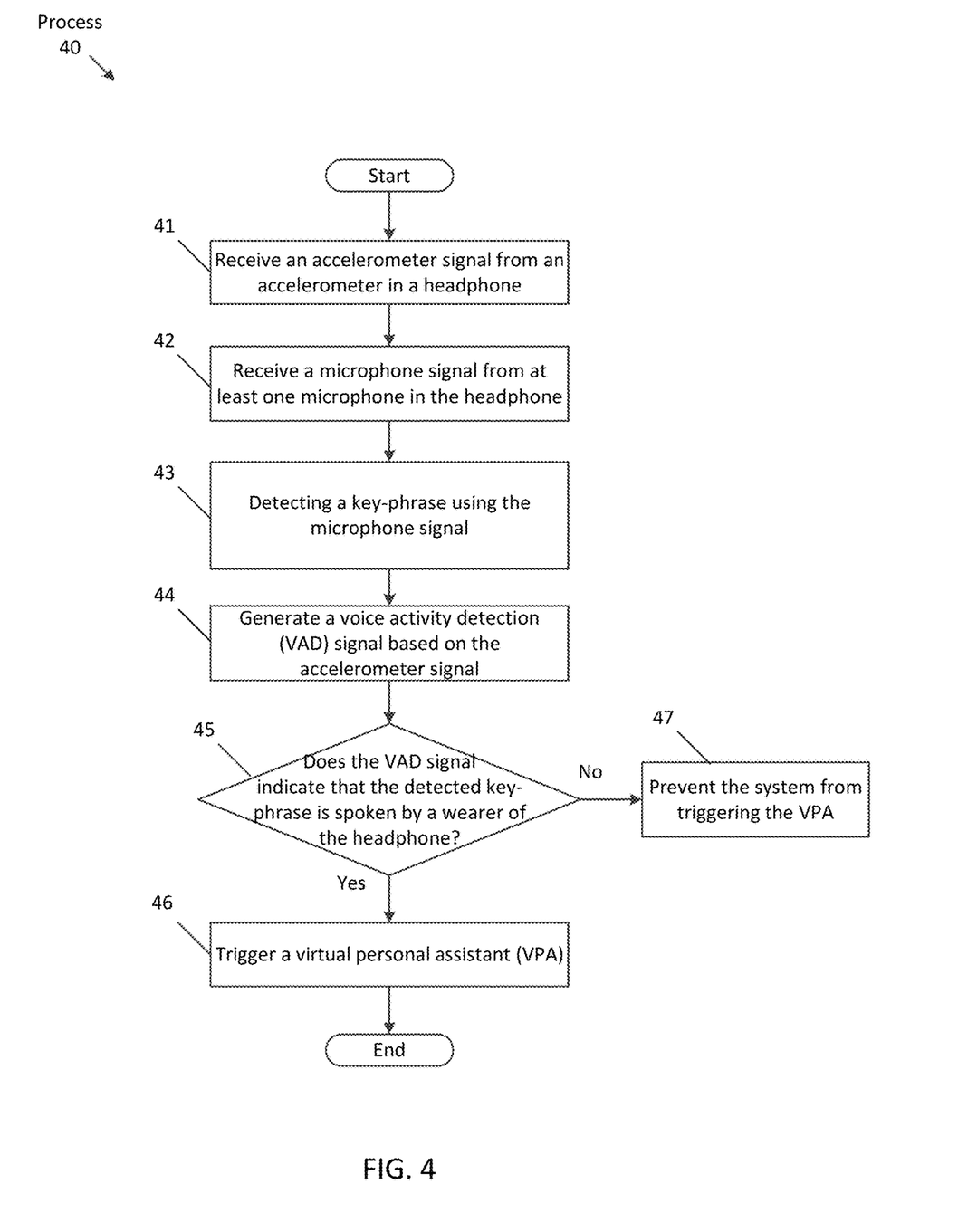
FIG. 4 is a flowchart of one aspect of a process to perform automatic speech recognition using an accelerometer signal according to one aspect.
Figure 5:
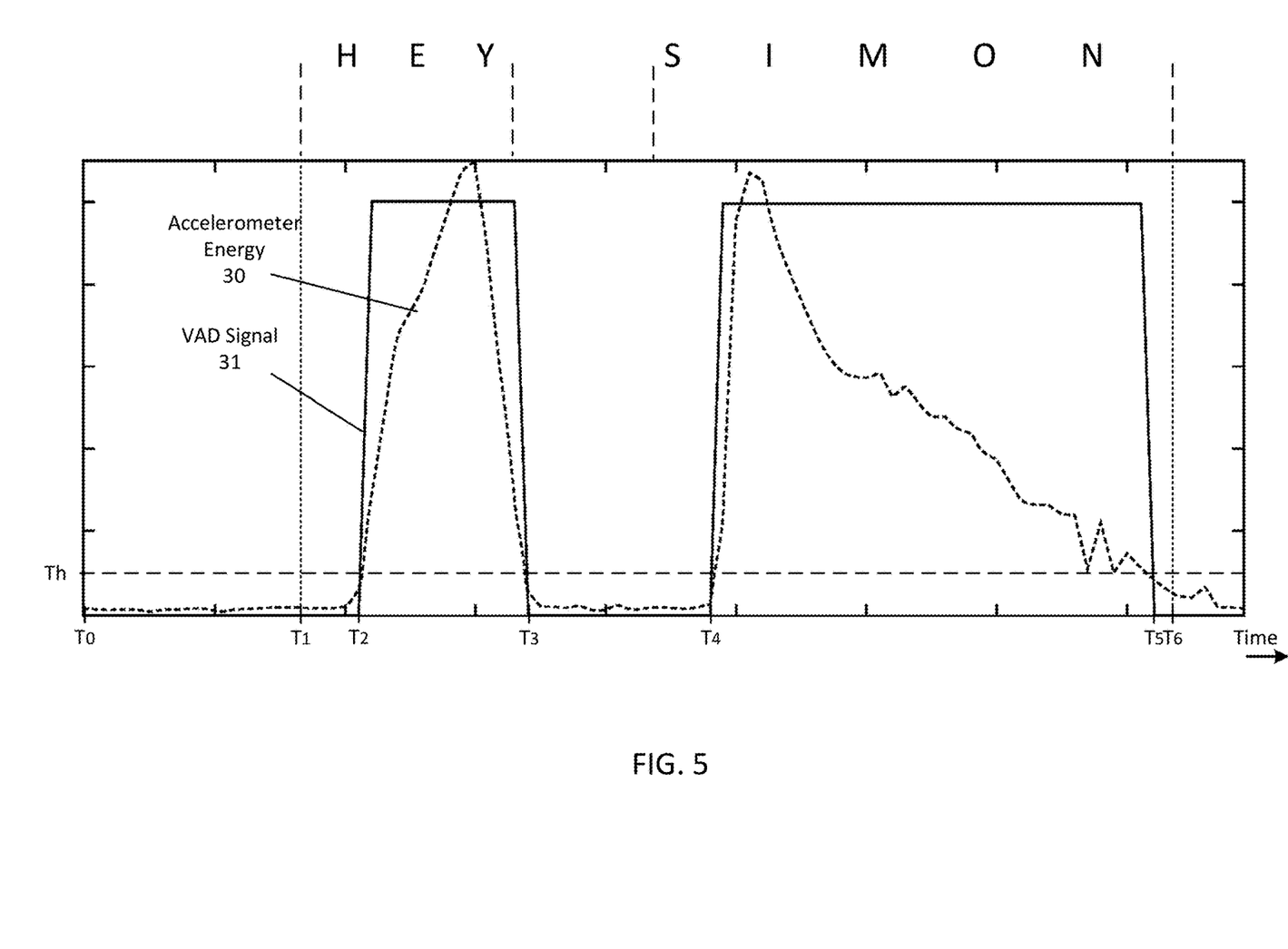
FIG. 5 is a graph that illustrates a relationship between an accelerometer signal and a voice activity detection (VAD) signal according to one aspect.

FIG. 4 is a flowchart of one aspect of a process 40 to perform automatic trigger detection using an accelerometer signal according to one aspect. This figure will be described with reference to FIG. 3. In one aspect, at least some of the process 40 may be performed by the audio system 1 (e.g., automatic trigger detector 17 of the headphone 2). In another aspect, at least some of the process 40 may be performed by the multimedia device with which the headphone is paired. The process 40 begins by receiving an accelerometer signal from an accelerometer in the headphone 2 (at block 41). The process 40 receives a microphone signal from at least one microphone in the headphone (at block 42). In one aspect, the accelerometer signal and/or the one or more microphone signals may be continuously received while the headphone is active (or in an on state). The process 40 detects a key-phrase using the microphone signal. For example, the key-phrase detector 18 may compare at least a portion of the microphone signal with pre-stored model of key-phrases. Along with detecting the key-phrase, the detector may also determine a start time and an end time for the key-phrase (at block 43). The process 40 generates a voice activity detection (VAD) signal based on the accelerometer signal (at block 44). Specifically, the VAD 19 may generate the VAD signal without using the microphone signal (or only using the accelerometer signal). The process 40 determines whether the VAD signal indicates that the detected key-phrase is spoken by a wearer of the headphone (at decision block 45). Specifically, the controller 15 generates a VAD score using a portion of the VAD signal that starts at the start time and ends at the end time. The controller 15 may then determine whether the VAD score is above a VAD score threshold. Responsive to determining that the VAD signal indicates that the detected key-phrase is spoken by the wearer of the headphone, the process 40 triggers a virtual personal assistant (at block 46). In one aspect, the controller 15 triggers the VPA by generating a trigger signal and transmitting the trigger signal to a companion device that is executing the VPA. In one aspect, the VAD signal may indicate that the detected key-phrase is spoken by the wearer when the VAD score is above the VAD score threshold. Responsive, however, to determining that the VAD signal does not indicate that the detected key-phrase is spoken by the wearer of the headphone, the process 40 prevents the audio system from triggering the VPA (at block 47). For example, the controller 15 may not transmit a trigger signal to the companion device. As another example, the controller 15 may generate a trigger signal, but one that indicates to the companion device to not trigger or activate the VPA.

Some aspects may perform variations to the processes described herein. For example, the specific operations of at least some of the processes may not be performed in the exact order shown and described. The specific operations may not be performed in one continuous series of operations and different specific operations may be performed in different aspects.

FIG. 5 is a graph that illustrates a relationship between accelerometer energy within the accelerometer signal and the VAD signal with respect to the user's utterance of the key-phrase "Hey Simon", according to one aspect. Specifically, this graph illustrates the VAD signal 31 that is generated by the VAD 19 based on the accelerometer energy 30 (of the accelerometer signal) that is obtained from the accelerometer 5, while the user says the key-phrase. Thus, as illustrated, both signals correspond to the user's utterance of the key-phrase.

Starting from $T_0$ to $T_2$, the accelerometer signal is low, e.g., below the threshold "Th", which may be the energy threshold described herein. The low signal level of the accelerometer signal 30 may be due to several factors. For instance, the low signal level may be due to the fact that the user is not saying anything. As another example, the user may be saying (or beginning to say) something, but the word or phrase does not generate a significant amount of bone conduction vibrations. For example, as illustrated, a segment of the VAD signal between $T_0$ and $T_2$ is at a low signal level, which includes the "H" portion of "Hey". At $T_2$, however, the user begins to say the "ey" portion of the word "Hey". When that occurs, the energy level of the accelerometer signal increases, past the Th, resulting in the VAD signal 31 changing from a low signal level to a high signal level. Between $T_2$ and $T_3$, the accelerometer signal 30 stays above Th due to the bone conduction vibrations that occur while the user is saying "ey", thereby resulting in the VAD signal 31 having a high signal level.

At $T_3$, however, the accelerometer signal 30 drops below Th, causing the VAD signal to switch from the high signal level to the low signal level. At this point, the user has finished saying the first word "Hey" in the key-phrase and started the word "Simon". Between $T_3$ and $T_4$, the accelerometer signal remains below Th, causing the VAD signal to remain at the low signal level. This segment of the VAD signal is low because the user has paused between both words in the key-phrase. Also, during this segment, the user has begun saying the second word of the key-phrase "Simon." Similar to the "H" sound, the "S" portion of "Simon" does not conduct much bone conduction vibrations and therefore, the accelerometer signal remains low. One again, however, at $T_4$, the accelerometer signal increases above Th, causing the VAD signal 31 to switch from the low signal level to the high signal level. This corresponds to the user's utterance of "imon" of "Simon" in the key-phrase. At $T_5$, the user finishes saying Simon and then the VAD signal drops back down to the low signal level.

In one aspect, the key-phrase detector 18 may determine the start and end times for the key-phrase in order for the VAD score generator 21 to retrieve a portion of the VAD signal 30 that is between the start/end times. In this example, the detector 18 may determine that the start time of the key-phrase is $T_1$ and the end time is $T_6$. Thus, the VAD score generator 21 is configured to retrieve the portion of the VAD signal between (and including) those two times. As a result, the VAD signal includes at least two segments that have low signal levels. In particular, the portion includes a segment between $T_1$ and $T_2$, between $T_3$ and $T_4$, and between $T_5$ and $T_6$.

In one aspect, either of the start/end times may be different. For instance, rather than $T_1$ be the start time, $T_0$ or $T_2$ may be the start times. Similarly, rather than $T_6$ be the end time, $T_5$ may be the end time. In one aspect, any point in time may be designated as the start/end times, so long as 1) there is a low signal level segment between the start time and the first time the VAD signal 31 goes to a high signal level and 2) that the start/end times encompass the entire key-phrase. In another aspect, an offset between $T_1$ and $T_2$ and/or between $T_5$ and $T_6$ may be predefined. Specifically, the detector may define $T_1$ at a certain time before the first sound of the first word (e.g., 100 milliseconds), while $T_6$ may be defined at a same or different time after the user finishes saying the last word (e.g., 50 milliseconds). In one aspect, the detector may apply an offset in order to ensure that the entire key-phrase is included and/or to ensure that the VAD signal starts with a low signal level.

Personal information that is to be used should follow practices and privacy policies that are normally recognized as meeting (and/or exceeding) governmental and/or industry requirements to maintain privacy of users. For instance, any information should be managed so as to reduce risks of unauthorized or unintentional access or use, and the users should be informed clearly of the nature of any authorized use.

As previously explained, an aspect of the disclosure may be a non-transitory machine-readable medium (such as microelectronic memory) having stored thereon instructions, which program one or more data processing components (generically referred to here as a "processor") to perform the network operations, signal processing operations, audio signal processing operations, and automatic speech recognition operations. In other aspects, some of these operations might be performed by specific hardware components that contain hardwired logic. Those operations might alternatively be performed by any combination of programmed data processing components and fixed hardwired circuit components.

While certain aspects have been described and shown in the accompanying drawings, it is to be understood that such aspects are merely illustrative of and not restrictive on the broad disclosure, and that the disclosure is not limited to the specific constructions and arrangements shown and described, since various other modifications may occur to those of ordinary skill in the art. The description is thus to be regarded as illustrative instead of limiting.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

What is claimed is:

1. A signal processing method performed by a programmed processor of a headphone that includes an accelerometer and a microphone, the method comprising:
receiving, while the headphone is being worn by a wearer, 1) an accelerometer signal from the accelerometer in the headphone and 2) a microphone signal from the microphone in the headphone that is arranged to capture sound of an environment in which the wearer is located;
generating a voice activity detection (VAD) signal based on the accelerometer signal;
storing the VAD signal in a buffer;
processing the microphone signal to detect a key-phrase, wherein at least some of the key-phrase is detected within a microphone time interval of the microphone signal;
retrieving a portion of the VAD signal from the buffer, wherein the portion of the VAD signal was generated from a portion of the accelerometer signal that is within the microphone time interval;
determining whether the portion of the VAD signal indicates that the key-phrase is spoken by the wearer of the headphone; and
responsive to determining that the portion of the VAD signal indicates that the key-phrase is spoken by the wearer of the headphone, triggering a virtual personal assistant (VPA),
wherein the accelerometer and the microphone are always active while the headphone is worn by the wearer such that the accelerometer signal and the microphone signal are continuously received.

2. The signal processing method of claim 1, wherein the buffer is a rolling buffer, wherein the VAD signal is continuously generated as the accelerometer signal is being received, and stored within the rolling buffer, while the headphone is worn by the wearer.

3. The signal processing method of claim 1, wherein determining whether the portion of the VAD signal indicates that the key-phrase is spoken by the wearer of the headphone comprises determining whether a VAD score that is based on the portion of the VAD signal is above a VAD score threshold, wherein the VAD signal indicates that the key-phrase is spoken by the wearer when the VAD score is above the VAD score threshold.

4. The signal processing method of claim 3, wherein generating a VAD signal based on the accelerometer signal comprises
determining whether an energy level of the accelerometer signal is above an energy threshold;
in response to determining that the energy level is above the energy threshold, setting the VAD signal to a high signal level; and
in response to determining that the energy level is below the energy threshold, setting the VAD signal to a low signal level.

5. The signal processing method of claim 4, wherein the portion of the VAD signal comprises a plurality of segments, each segment having either the high signal level or the low signal level, wherein generating the VAD score comprises averaging the plurality of segments to produce an average VAD score value as the VAD score.

6. The signal processing method of claim 5, wherein generating the VAD score further comprises applying a correction factor to the average VAD score value that accounts for segments of the portion of the VAD signal in a normally uttered key-phrase that are at the low signal level.

7. The signal processing method of claim 3, wherein the headphone is communicatively coupled with a multimedia device via a communication data link, wherein triggering the VPA comprises
generating a trigger signal; and
transmitting, from the headphone and over the communication data link, at least one of the trigger signal, the VAD score, and the microphone signal to the multimedia device.

8. The signal processing method of claim 1, wherein the microphone time interval is a first microphone time interval, the portion of the VAD signal is a first portion of the VAD signal, and the portion of the accelerometer signal is a first portion of the accelerometer signal, wherein the entire key-phrase is detected within the first microphone time interval, wherein the method further comprises:
processing the microphone signal to detect the entire key-phrase within a second microphone time interval of the microphone signal, wherein the second microphone time interval is shorter than the first microphone time interval;
retrieving a second portion of the VAD signal from the buffer that was generated from a second portion of the accelerometer signal that is within the second microphone time interval;
responsive to determining that the second portion of the VAD signal indicates that the entire key-phrase is spoken by the wearer of the headphone, triggering the VPA.

9. An audio system comprising:
a headphone having an accelerometer and at least one microphone integrated therein;
at least one processor; and
memory having stored therein instructions which when executed by the at least one processor cause the system to
receive, while the headphone is being worn by a wearer, 1) an accelerometer signal from the accelerometer and 2) a microphone signal from the at least one microphone that is arranged to capture sound of an environment in which the wearer is located,
generate a voice activity detection (VAD) signal based on the accelerometer signal,
store the VAD signal in a buffer,
process the microphone signal to detect a key-phrase, wherein at least some of the key-phrase is detected within a microphone time interval of the microphone signal,
retrieve a portion of the VAD signal from the buffer, wherein the portion of the VAD signal was generated from a portion of the accelerometer signal that is within the microphone time interval,
determine whether the portion of the VAD signal indicates that the key-phrase is spoken by the wearer of the headphone, and
responsive to a determination that the portion of the VAD signal indicates that the key-phrase is spoken by the wearer of the headphone, trigger a virtual personal assistant
wherein the accelerometer and the microphone are always active while the headphone is worn by the wearer such that the accelerometer signal and the microphone signal are continuously received.

10. The audio system of claim 9, wherein the buffer is a rolling buffer, wherein the VAD signal is continuously generated as the accelerometer signal is being received, and stored within the rolling buffer, while the headphone is worn by the wearer.

11. The audio system of claim 9, wherein the instructions to determine whether the portion of the VAD signal indicates that the key-phrase is spoken by the wearer of the headphone comprises instructions to determine whether a VAD score that is based on the portion of the VAD signal is above a VAD score threshold, wherein the VAD signal indicates that the key-phrase is spoken by the wearer when the VAD score is above the VAD score threshold.

12. The audio system of claim 11, wherein the instructions to generate a VAD signal based on the accelerometer signal comprises instructions to
determine whether an energy level of the accelerometer signal is above an energy threshold;
in response to a determination that the energy level is above the energy threshold, set the VAD signal to a high signal level; and
in response to a determination that the energy level is below the energy threshold, set the VAD signal to a low signal level.

13. The audio system of claim 12, wherein the portion of the VAD signal comprises a plurality of segments, each frame having either the high signal level or the low signal level, wherein the instructions to generate the VAD score comprises instructions to average the plurality of segments to produce an average VAD score value as the VAD score.

14. The audio system of claim 13, wherein the instructions to generate the VAD score further comprises instructions to apply a correction factor to the average VAD score value that accounts for segments of the portion of the VAD signal that are at the low signal level in a normally uttered key-phrase.

15. The audio system of claim 11, wherein the instructions to trigger the VPA comprises instructions to 1) generate a trigger signal and 2) transmit, over a communication data link and to a multimedia device, at least one of the trigger signal, the VAD score and the microphone signal.

16. The audio system of claim 9 further comprising a multimedia device that is communicatively coupled with the headphone via a communication data link, wherein the instructions for determining whether the portion of the VAD signal indicates that the key-phrase is spoken by the wearer of the headphone is executed by a processor of the multimedia device.

17. A non-transitory machine-readable storage medium having instructions stored therein that when executed by a processor of an audio system having a headphone:
receive, while the headphone is being worn by a wearer, 1) an accelerometer signal from an accelerometer in the headphone and 2) a microphone signal from at least one microphone in the headphone that is arranged to capture sound of an environment in which the wearer is located;
generate a voice activity detection (VAD) signal based on the accelerometer signal;
store the VAD signal in a buffer;
process the microphone signal to detect a key-phrase, wherein at least some of the key-phrase is detected within a microphone time interval of the microphone signal;
retrieve a portion of the VAD signal from the buffer, wherein the portion of the VAD signal was generated from a portion of the accelerometer signal that is within the microphone time interval;

determine whether the portion of the VAD signal indicates that the key-phrase is spoken by the wearer of the headphone; and responsive to a determination that the portion of the VAD signal indicates that the key-phrase is spoken by the wearer of the headphone, trigger a virtual personal assistant (VPA), wherein the accelerometer and the at least one microphone are always active while the headphone is worn by the wearer such that the accelerometer signal and the microphone signal are continuously received.

18. The non-transitory machine-readable storage medium of claim 17, wherein the buffer is a rolling buffer, wherein the VAD signal is continuously generated as the accelerometer is being received, and stored within the rolling buffer, while the headphone is worn by the wearer.

19. The non-transitory machine-readable storage medium of claim 17, wherein the instructions to determine whether the portion of the VAD signal indicates that the key-phrase is spoken by the wearer of the headphone comprises instructions to determine whether a VAD score that is based on the portion of the VAD signal is above a VAD score threshold, wherein the VAD signal indicates that the key-phrase is spoken by the wearer when the VAD score is above the VAD score threshold.

20. The non-transitory machine-readable storage medium of claim 19, wherein the instructions to generate a VAD signal based on the accelerometer signal comprises instructions to determine whether an energy level of the accelerometer signal is above an energy threshold;

in response to a determination that the energy level is above the energy threshold, set the VAD signal to a high signal level; and in response to a determination that the energy level is below the energy threshold, set the VAD signal to a low signal level.

21. The non-transitory machine-readable storage medium of claim 20, wherein the portion of the VAD signal comprises a plurality of segments, each frame having either the high signal level or the low signal level, wherein the instructions to generate the VAD score comprises instructions to average the plurality of segments to produce an average VAD score value as the VAD score.

22. The non-transitory machine-readable storage medium of claim 21, wherein the instructions to generate the VAD score comprises further instructions to apply a correction factor to the average VAD score value that accounts for segments of the portion of the VAD signal is a normally uttered key-phrase that are at the low signal level.

* * * * *